US009460304B1

(12) United States Patent
Tsai et al.

(10) Patent No.: US 9,460,304 B1
(45) Date of Patent: Oct. 4, 2016

(54) DATA SERVICES GENERATION

(71) Applicant: EMC Corporation, Hopkinton, MA (US)

(72) Inventors: Kenwood Tsai, Palo Alto, CA (US); Satyapal P. Reddy, Fremont, CA (US); Arnaud Viltard, Oakland, CA (US); Sachin G. Totale, Bangalore (IN); Ashraf A Syed, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/631,426

(22) Filed: Sep. 28, 2012

(51) Int. Cl.
*G06F 7/00* (2006.01)
*G06F 17/30* (2006.01)
*G06F 9/44* (2006.01)
*G06F 21/62* (2013.01)
*G06Q 30/02* (2012.01)

(52) U.S. Cl.
CPC ............ *G06F 21/6218* (2013.01); *G06F 8/10* (2013.01); *G06F 8/20* (2013.01); *G06F 17/30864* (2013.01); *G06Q 30/02* (2013.01); *G06F 2221/2141* (2013.01)

(58) Field of Classification Search
USPC ......................................... 709/226; 717/135
See application file for complete search history.

(56) References Cited

U.S. PATENT DOCUMENTS

| | | | | |
|---|---|---|---|---|
| 2004/0068501 | A1* | 4/2004 | McGoveran | 707/8 |
| 2007/0266377 | A1* | 11/2007 | Ivanov | 717/136 |
| 2008/0163224 | A1* | 7/2008 | Frank et al. | 718/102 |
| 2008/0208972 | A1* | 8/2008 | Chou et al. | 709/204 |
| 2008/0306751 | A1* | 12/2008 | Conroy et al. | 705/1 |
| 2009/0138294 | A1* | 5/2009 | Kumaran et al. | 705/7 |
| 2010/0153778 | A1* | 6/2010 | Weber et al. | 714/16 |
| 2011/0066565 | A1* | 3/2011 | Day | 705/348 |
| 2011/0238974 | A1* | 9/2011 | Wells et al. | 713/100 |
| 2012/0179825 | A1* | 7/2012 | Dhoolia et al. | 709/226 |

OTHER PUBLICATIONS

Informed Consulting ("Documentum Stateless Process Engine," Jan. 23, 2012. http://www.informedconsulting.nl/blog/?p=252).*
Oracle Fusion Middleware Developers Guide for Oracle SOA Suite, "Getting Started with Binding Components." Jun. 2011. http://docs.oracle.com/cd/E25054_01/dev.1111/e10224/sca_bindingcomps.htm.*
EIC 3600 Non-Patent Literature Search Report—13631426.*

* cited by examiner

*Primary Examiner* — Mark A Fleischer
*Assistant Examiner* — Johnathan Lindsey, III
(74) *Attorney, Agent, or Firm* — Van Pelt, Yi & James LLP

(57) ABSTRACT

A system for generation of a RESTful data service comprises a processor and a memory. The processor is configured to: receive a business process model; read the business process model to determine one or more inputs and one or more outputs; generate code for a RESTful data service to invoke the business process model that provides the input data and processes the output data; and generate a URL for the RESTful data service, wherein the URL represents the business process as an addressable resource. The memory is coupled to the processor and is configured to provide the processor with instructions.

20 Claims, 16 Drawing Sheets

1  New Process

Process
A process orchestrates the flow of information through system and user tasks to complete a goal.

Label: Get Employers from Sector

☑ Process can run in stateless mode

2  Define the inputs and the outputs

Varible D...

Name: sector_input
Type: ⦿ Single value  ◯ Multivalue
Default Value:

Stateless Service Settings
◯ Not used for input or output
⦿ Use for input only
◯ Use for output only Name: employers_output
Type: ◯ Single value  ⦿ Multivalue
Default Value: The default value for this type can not be set.

Stateless Service Settings
◯ Not Used for input or output
◯ Use for input only
⦿ Use for output only

FIG. 1C

DATA SERVICES GENERATION

BACKGROUND OF THE INVENTION

Typical data services that enabled access to data sources required manual coding. Also, in many cases there is no automatic orchestration of data sources and data mappings. This means that these systems are complex to generate and maintain and are not easy to change as the system and needs for the system evolve. Further, they require high technical skills to modify and maintain. In addition, data services often use a standard asynchronous business process engine to orchestrate the data sources, this results in indeterminate and unpredictable execution times.

BRIEF DESCRIPTION OF THE DRAWINGS

Various embodiments of the invention are disclosed in the following detailed description and the accompanying drawings.

FIG. 1C is a diagram illustrating an embodiment of example user interface(s) for development of a service using a data services generation system.

DETAILED DESCRIPTION

Figure 1A:
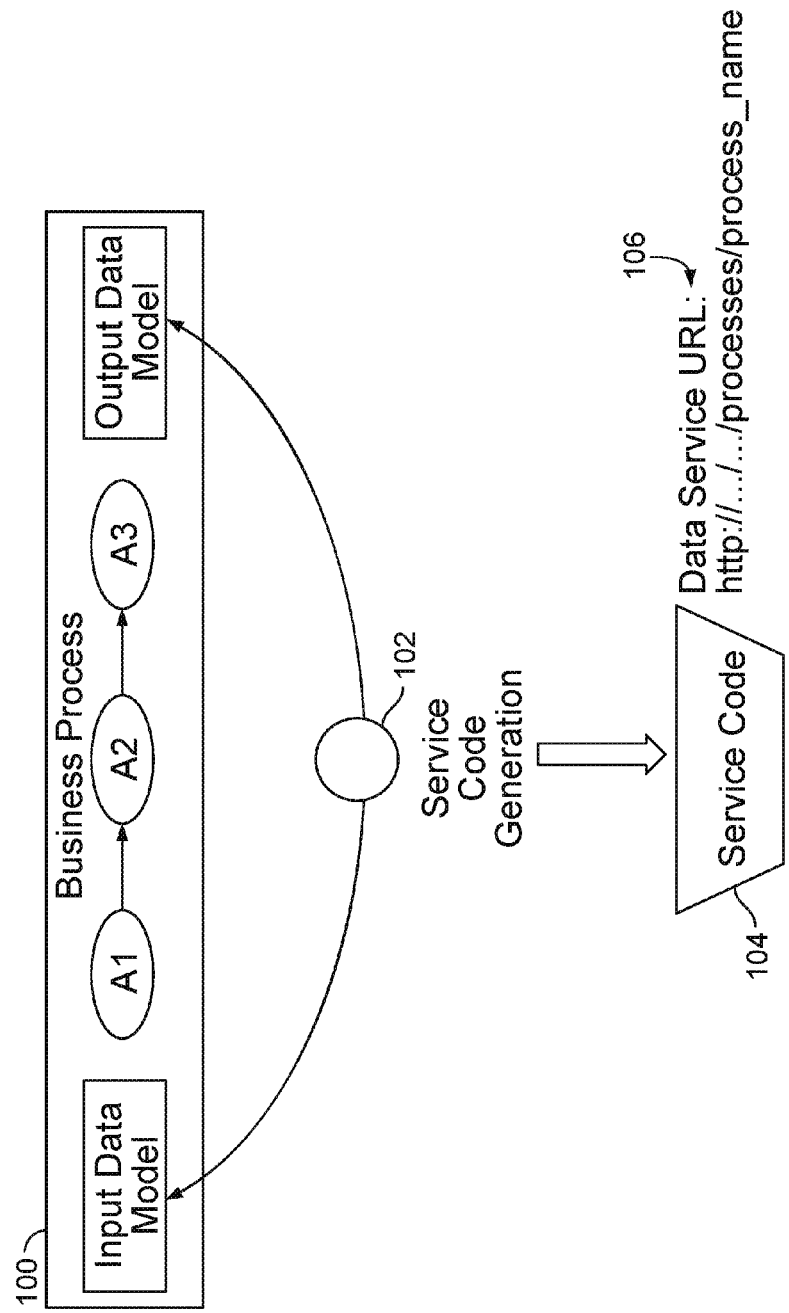
FIG. 1A is a block diagram illustrating an embodiment of a RESTful data services generation system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A RESTful (REpresentational State Transfer) data services generation system is disclosed. The system comprises a processor and a memory. The processor is configured to: receive a business process model—for example, a stateless, synchronous business process engine; read the business process model to determine input(s) and output(s); generate code for a RESTful data service to invoke the business process model that receives the input data and responds with the output data; and generate a URL (uniform resource locator) for the RESTful data service, wherein the URL represents the business process as an addressable resource. The memory is coupled to the processor and is configured to provide the processor with instructions.

Advantages of a RESTful data services generation system include: 1) configuration-based generation of data services, no coding required; 2) automatic generation of data services from data model introspection; 3) synchronous orchestration over multiple data sources; 4) simplified maintenance and evolution (product upgrade); 5) easy configuration increasing the responsiveness to business needs; 6) a WYSIWYG (what-you-see-is-what-you-get) editor that doesn't require high user expertise; and 7) improved reusability.

In some embodiments, the system comprises a mechanism for exposing data sources as RESTful data services that can be consumed by web service clients in a corporate network and across the internet. The data services are accessed over HTTP (hypertext transfer protocol) and URIs (uniform resource identifiers) are used to address the data available through the service. The REST interactions with the data happens in terms of HTTP verbs—for example, get, post, put, and delete—and the data exchanged in the interactions is represented in both XML (extensible markup language) and JSON (Javascript object notation) formats.

In some embodiments, a typical scenario handled with the RESTful data services generation system requires orchestrated access across multiple data sources. A synchronously executing business process engine is responsible for orchestrating the access to the disparate data sources, mapping and transforming data from each individual data source, and returning the result. A business process model serves as the definition for the data service. The business process model defines a set of input data and output data. The data definition becomes the request and response interface for the RESTful service. A service generator reads the business process model, and based on the model's data definition, generates code to receive and process the request URL, invoke the stateless process synchronously, pass in the correctly mapped input data, get the output data from the completed process execution, and return it to the service's client.

In some embodiments, an application service consumes a stateless process as a data service/source to fetch arbitrary information from a data repository or external resource (e.g., relational data base management system (RDBMS), web service, hypertext transfer protocol (HTTP), etc.). The stateless process can be configured to take inputs and return outputs using process variables. The returned outputs can be either a single object or a list of objects. The output is used as a data service/source and can be bound to a result list, text, label, etc. to display a result in a graphical user interface. For example:
 a. Find order details for a customer; input: customer ID; output: order information (repeating attributes)
 b. Find the zip code for a city; input: city name; output: zip code In some embodiments, in the event that the service encounters an error while executing the stateless process engine, a service error is returned.

In some embodiments, a user composes a stateless process and saves it. A builder generates the data source/service for the stateless process. The user then binds this data service to any control in a user interface page builder. The data source/service is similar to a real-time search service. The stateless process can have process variables that are marked for input or output. The process variables marked for input are defined in an input domain class. The process variables marked for output are defined in an output domain class. There is a base controller which does not have any business logic defined and only delegates calls to the service class. The constructor takes the following three arguments: 1) a process URN (uniform resource name); 2) class <I> input; and 3) class <O> output.

FIG. 1A is a block diagram illustrating an embodiment of a RESTful data services generation system. In the example shown, the RESTful data services generation system is shown during a development (or design) timeframe. Business process model 100 is defined with input and output data definitions. Each individual activity in business process model 100 (A1-A3) is orchestrated to access a specific data source or a data mapping step. Service code generator 102 introspects the process' input and output data model. Service code 104 is generated to invoke the process while mapping to it the required input data and processing the resulting output data based on the introspected models. URL 106 is generated for the RESTful data service, which represents the business process as an addressable resource.

Figure 1B:
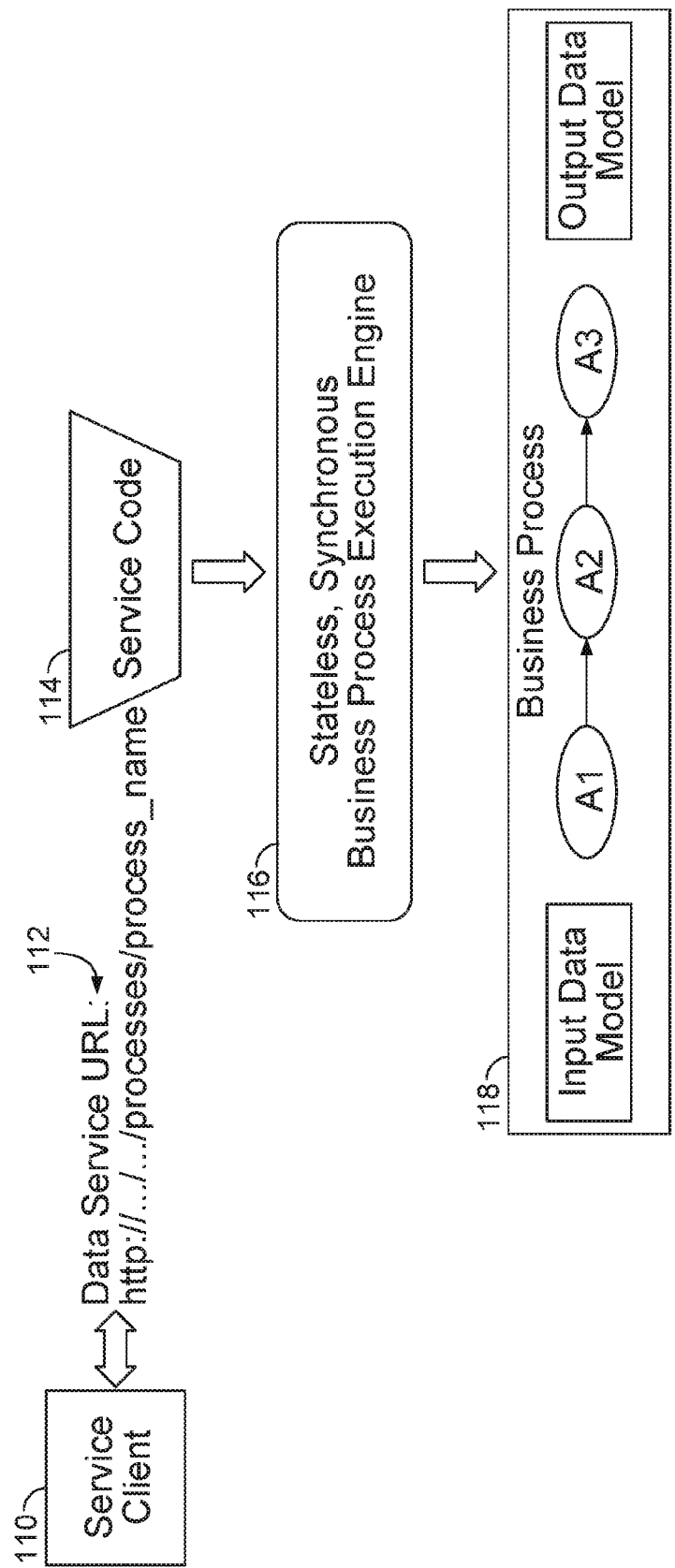
FIG. 1B is a block diagram illustrating an embodiment of a RESTful data services generation system.

FIG. 1B is a block diagram illustrating an embodiment of a RESTful data services generation system. In the example shown, the RESTful data service generation system is shown from a run-time or usage perspective. Service client 110 (e.g., a web client) invokes the RESTful data service through its provided URL 112, passing the required input data. Generated service code 114 processes the request based on URL 112 and its input parameters. Generated service code 114 invokes stateless, synchronous business process engine 116 to execute the specific business process model 118 to orchestrate the data source access. Stateless, synchronous process engine 116 executes the process with the provided input data and returns the appropriately mapped output data.

FIG. 1C is a diagram illustrating an embodiment of example user interface(s) for development of a service using a data services generation system. In the example shown, a new stateless process for carrying out the service is created. For example, for (1), a process is created that orchestrates the flow of information through a system to complete a goal; the process is labeled 'Get Employers from Sector' and is selected to be a process that can run in a stateless mode. For (2), the inputs and the outputs are defined. For example, a name and type of an input variable are selected (e.g., sector_input and string). The variable can be set as a single value variable or a multivalued variable (e.g., a single variable containing repeating values of the same data type, containing values of the same data type, etc.). A default value can be indicated. For the stateless service, the variable can be designated as 'not used for input or output', 'use for input only', and 'use for output only', or any other appropriate setting (e.g., use for input only). Or for example, a name and type of an output variable are selected (e.g., employers_output and string). The variable can be set as a single value variable or a multivalued variable (e.g., a single variable containing repeating values of the same data type, containing values of the same data type, etc.). A default value might be set, although in the example shown it is indicated that for this type that a default value cannot be set. For the stateless service, the variable can be designated as 'not used for input or output', 'use for input only', and 'use for output only', or any other appropriate setting. Multivalued variables cannot have a default value set. The variables determine the input and output data models provided for the generated service. Once the process is defined, its input and output data defined and their roles in the service (input or output or neither), then the service generator uses these definitions to provide the RESTful data service.

Figure 1D:
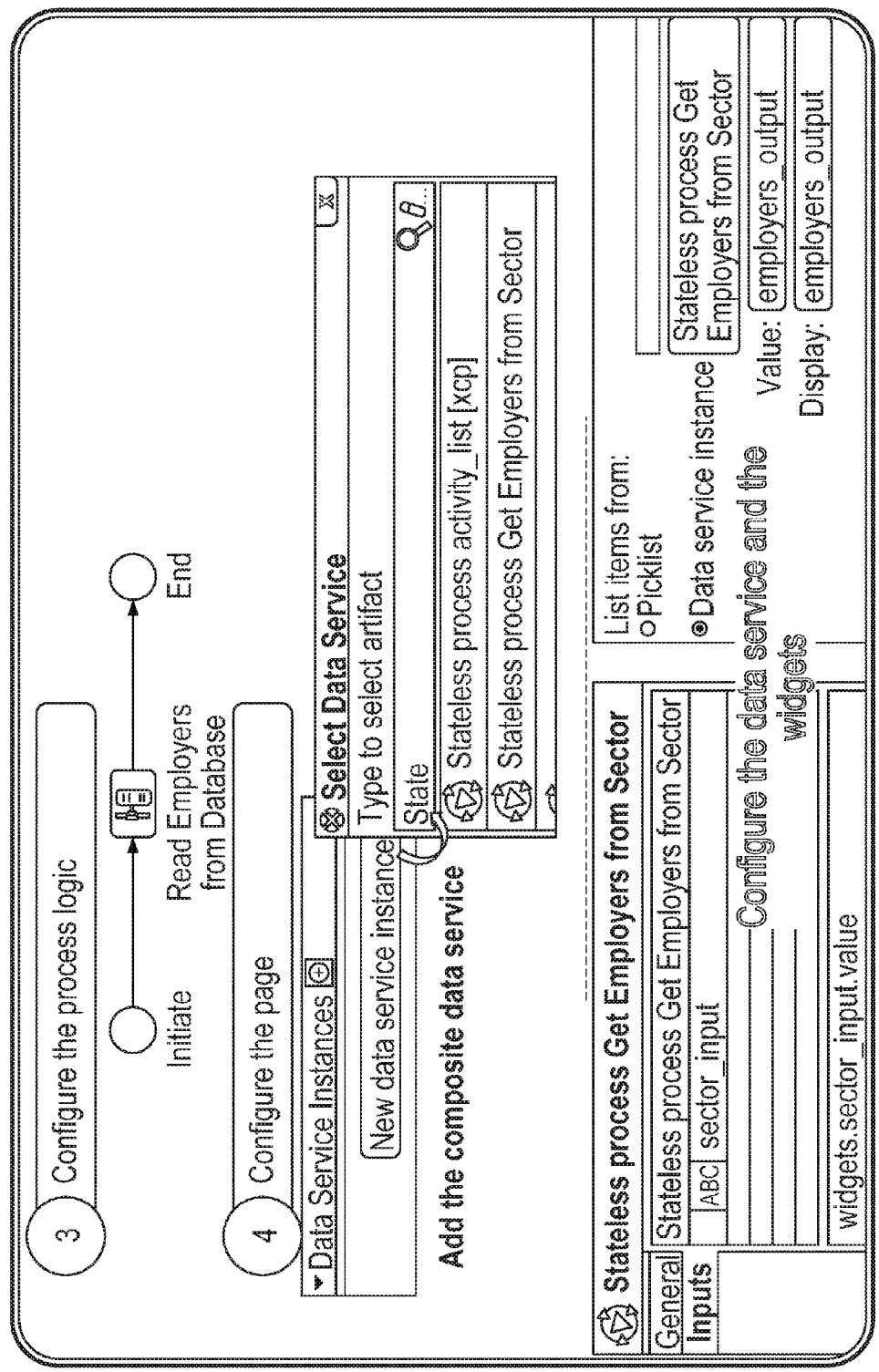
FIG. 1D is a block diagram illustrating an embodiment of example user interface(s) for invocation of a service using a RESTful data services generation system.

FIG. 1D is a block diagram illustrating an embodiment of example user interface(s) for invocation of a service using a RESTful data services generation system. In the example shown, for (3), the process logic is configured. For example, the process is initiated, employers are read from a database, and the process ends. For (4), the user interface page is configured. For example, the selection of the specific data service allows the required input and output data to be selected next. The service generated from the process model (e.g., "Get Employers From Sector") has the defined input and output data model that the UI reads and uses. For example, a new data service instance of the stateless process 'Get Employers from Sectors' is selected. The data service and the user interface widgets are configured. For example, the input tab shows a selection of sector_input for stateless process 'Get Employers from Sector'. The data service instance of stateless process 'Get Employers from Sector' indicates a value of employers_output and a display of employers_output.

Figure 1E:
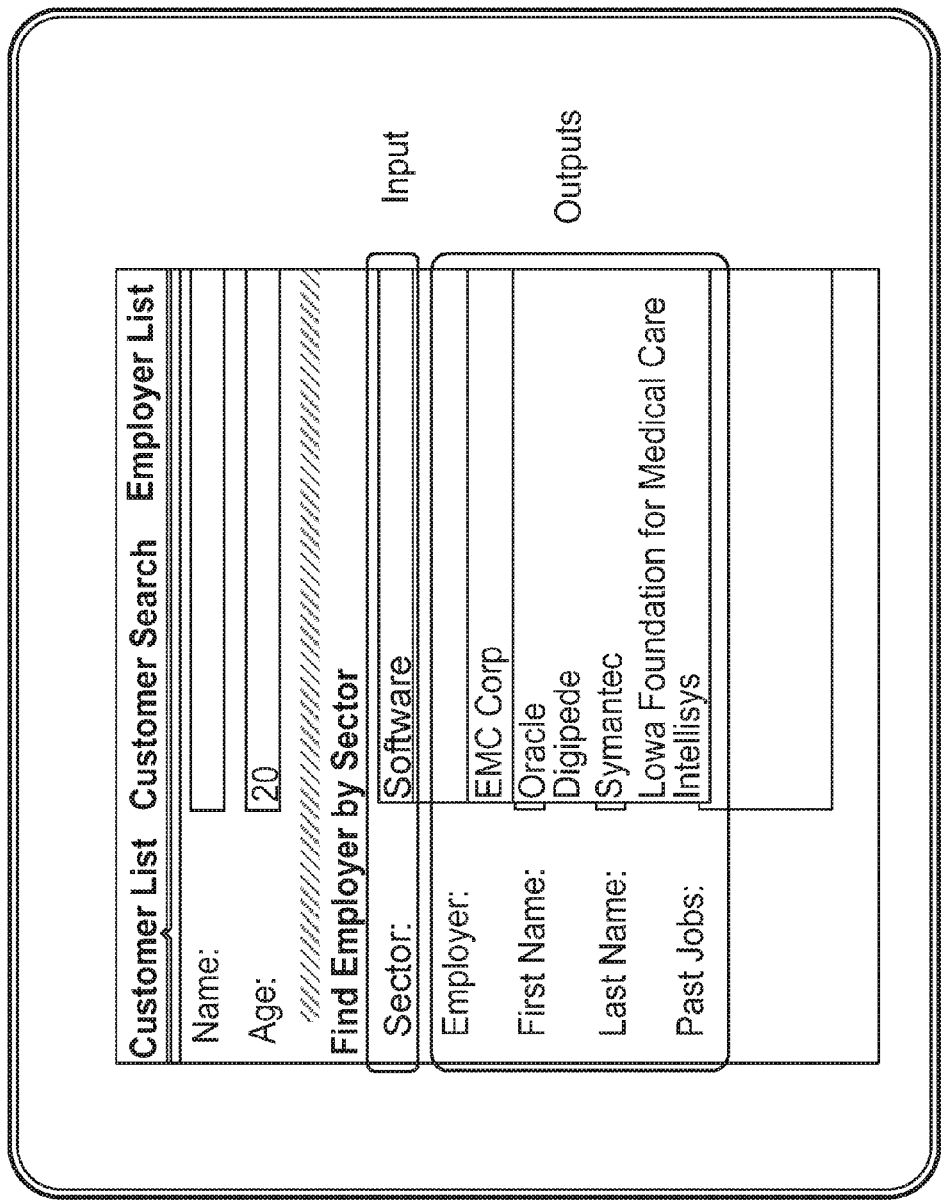
FIG. 1E is a block diagram illustrating an embodiment of an example user interface for running a service using a RESTful data services generation system.

FIG. 1E is a block diagram illustrating an embodiment of an example user interface for running a service using a RESTful data services generation system. In the example shown, an employer is found by sector. For example, a sector input is entered (e.g., 'software'). A list of employers is output or shown (e.g., EMC Corp, Oracle, Digipede, Symantec, Iowa foundation for medical care, Intellisys, etc.). The UI shown invokes the data service generated from the process model. The UI invokes the service by means of a RESTful service interaction with the URL exposed for the service, which in turn executes the process statelessly and synchronously in the synchronous process engine. The results of the invocation are displayed in the "Employer" list for selection by users of the system.

Figure 1F:
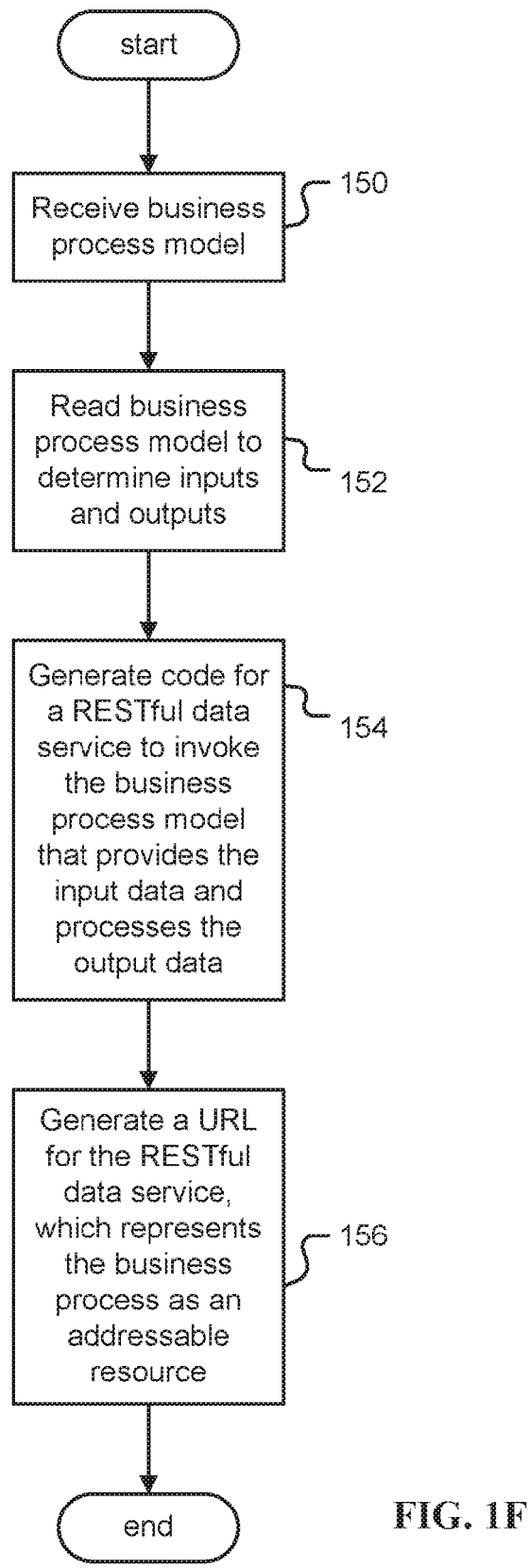
FIG. 1F is a flow diagram illustrating a process for developing a service using a RESTful data services generation system.

FIG. 1F is a flow diagram illustrating a process for developing a service using a RESTful data services generation system. In the example shown, in 150 a business process model is received. In 152, the business process model is read to determine inputs and outputs. In 154, code for a RESTful data service is generated to invoke the business process model that provides the input data and processes the output data. In 156, a URL is generated for the RESTful data service, which represents the business process as an addressable resource.

Figure 2:
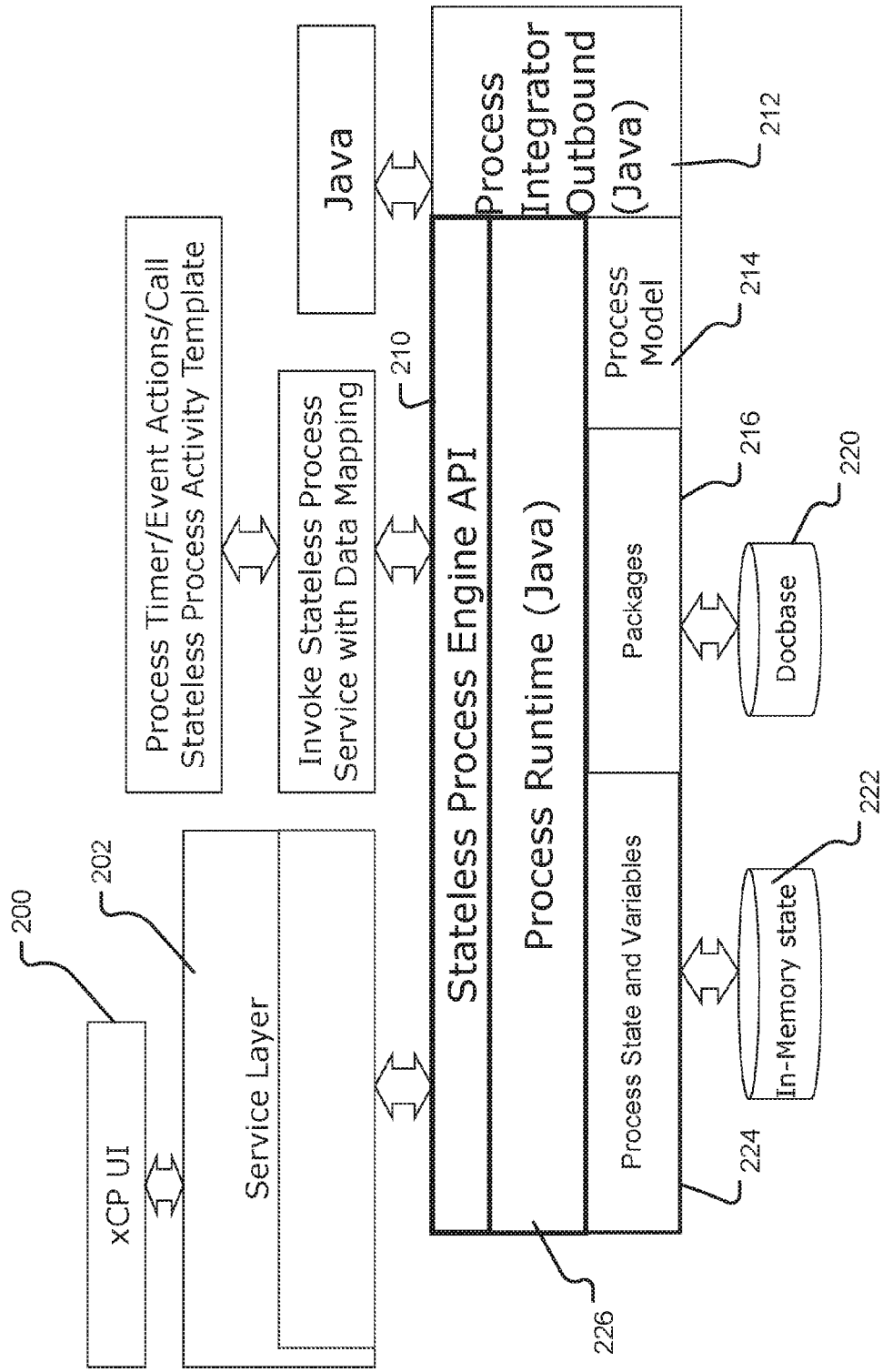
FIG. 2 is a block diagram illustrating an embodiment of an architecture for the system for generation and running of a RESTful data service using a stateless process.

FIG. 2 is a block diagram illustrating an embodiment of an architecture for the system for generation and running of a RESTful data service using a stateless process. In the example shown, all activities get executed from within the caller's thread and transaction. Any failure in any activity will throw an exception and cause the entire transaction to rollback. There is no workflow execution state persisted. Each stateless process in builder generates a data service that can be invoked from a page. xCP UI 200 is a user interface that the end user uses to interact with the system, e.g., user enters value "software" as an input and then clicks a button to get all employers which belong to that sector. Behind the scenes, this synchronously invokes the services layer. Service layer 202 is a combination of generated code (e.g., from 154 of FIG. 1F) and framework code. This in turn calls the stateless process engine API 210 with the inputs obtained from xCP UI 200. Stateless process engine API (Application Programming Interface) 210 is an interface to invoke the stateless engine with the inputs and the name of the process model and synchronously wait for outputs. Process integrator outbound (Java) 212 is a component that provides capability to add pluggable services into a stateless orchestration engine, e.g., capability to call an external web service or read from a specific database. These services in process integrator outbound (Java) 212 will be executed as and when the activities in process model 214 require them. For example, a stateless process model has an activity called "get employers based on sector name". This activity takes in "sector" name as an input and returns all the employers for that sector by executing a database query. The logic to execute this is embedded as part of process integrator outbound (Java) 212 component. Process model 214 contains the behavior, which is defined as a sequence of activities that need to be executed for a given process. This acts as a basis for the stateless engine to execute the modeled behavior. Packages 216 are the documents and business objects that are being acted upon or routed by the process. For example, a stateless process could take the social security number of a person as an input, query an external web service to get a credit score and update a person business object with the credit score. In this example, the person business object is being used in the process as a package. Docbase 220 is a data repository (e.g., a Documentum data repository) where the customer business data (e.g. person in above example) is stored. In-memory state 222 is a temporary memory storage to coordinate the execution of a series of activities in the process. This memory for a given stateless process instance is purged as soon as the response is sent to the caller from xCP UI 200. Process state and variables 224 used in the process are temporarily stored in memory for the duration of the call from xCP UI 200. Process state is used by the stateless process engine to coordinate the execution of the series of activities. Variables are part of the business logic and are used as inputs, outputs, and temporary placeholders for data that is used to execute the process. Process runtime (java) 226 is the orchestration logic which coordinates the execution of activities in the process.

In some embodiments, the business process model comprises a synchronous business process engine. A typical process engine executes the process in an "asynchronous" manner with respect to the process invocation mechanism. For example, the actual execution of the process by the process engine is not coordinated in time with its invocation. The engine may pause execution and resume it at a later time when resources are available, while the invoker has terminated or has moved on to another responsibility. On the other hand, a synchronous process engine executes the exact same business process models that the asynchronous one executes by using the same procedural markup definition; a user defining a process need not learn anything new nor do they need to revise existing models. The synchronous process engine operates on an entire business process, or in hybrid fashion as a specified "portion of a process" with the remainder of the business process operated on by an asynchronous process engine. The differentiating characteristics of the synchronous process engine include:

All portions of process execution related objects are fetched once and cached for the duration of execution;
No execution state is persisted during execution;
The entire portion of a process is executed in a single execution transaction context;
A "turbo-mode" level of high performance results (for example, because it performs in-memory execution of the portion of a process);
There is little, controlled, or no persistence-based latency or context switching between activities;
There are predictable execution times;
The activities and/or portion of a process executed are easily ordered;
It supports direct invocation via API; and
It is an embeddable engine and/or service.

Figure 3A:
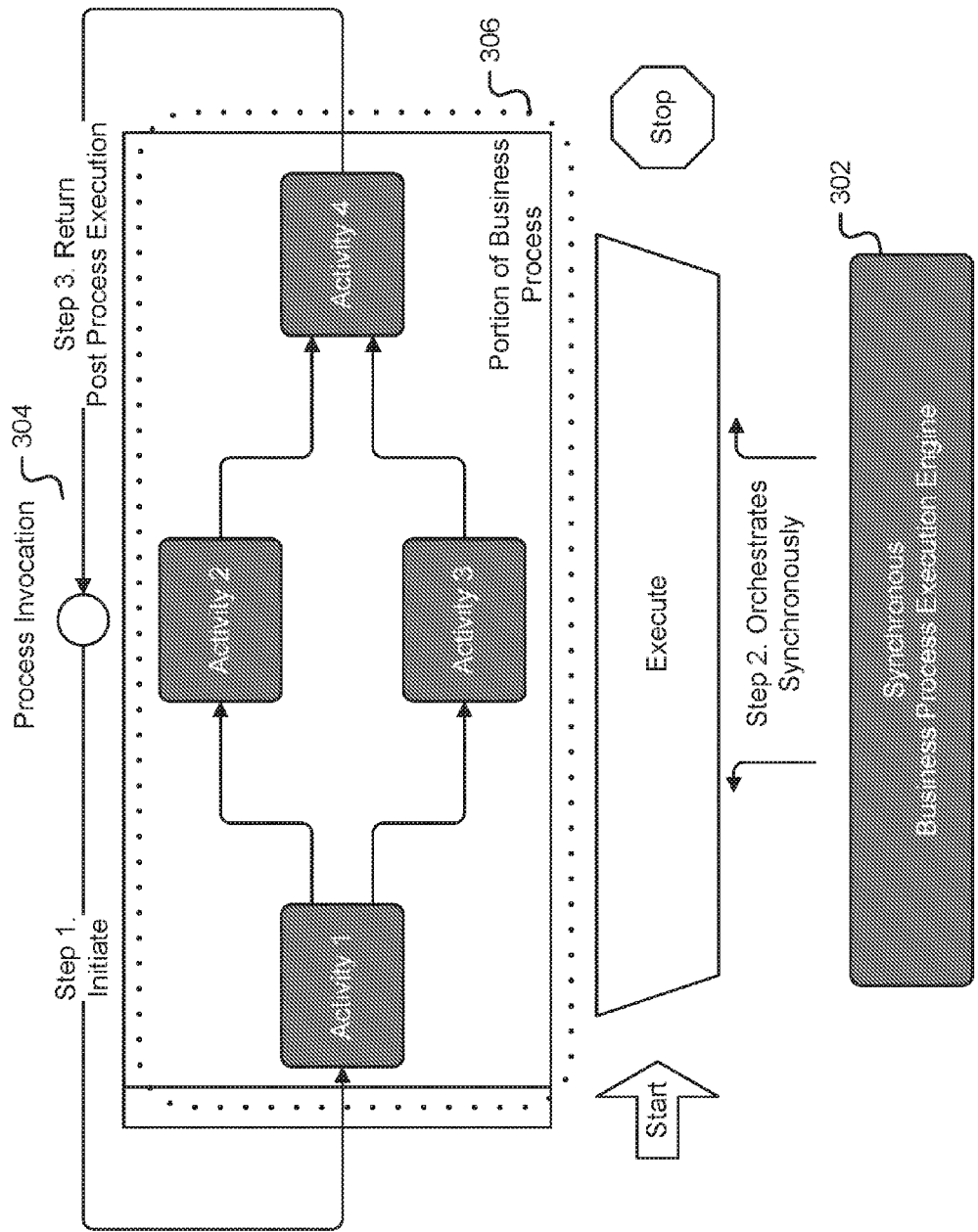
FIG. 3A is a diagram illustrating an embodiment of a synchronous process engine execution of a portion of a process.

FIG. 3A is a diagram illustrating an embodiment of a synchronous process engine execution of a portion of a process. The "synchronous" nature of the execution supports business processes that carry out actions that are synchronous in time relative to their invoker. The diagram in FIG. 3A describes the execution pattern of the synchronous business process execution engine 302.

The executing sequence pattern may follow this order:
a. A triggering condition 304 initiates the execution of a portion of a process 306 by the synchronous process engine and waits in a blocked state for the entire execution duration;
b. The synchronous process engine 302 executes the entire portion of process 306 in a single execution context with a predictable and/or determinate time before returning the results to the initiator 304, releasing it from its blocked state; and
c. The initiating party 304 receives the results of the completed execution and is released to perform other responsibilities.

In one sense, synchronous process engine 302 provides a "static" resource allocation wherein a computing resource is tied up statically for a single execution context, permitting a predictable and/or determinate time for execution.

In some embodiments, the synchronous process engine 302 orchestrates the activities through a variety of flow patterns like splits, parallel joins, "n out of m" joins, error forks, and others. Each orchestration managed by the process engine 302 may be initiated through a variety of different mechanisms, for example by an externally occurring event, through direct invocation via a software API, and/or from a computer software program's graphical user interface.

In some embodiments, the synchronous process engine 302 carries out the same set of activities, provides (e.g., a more limited) set of initiation mechanisms, and is capable of orchestrating the same flow patterns as the asynchronous engine. Since manual activities are asynchronous by nature, the synchronous engine ends the execution and returns to the invoker immediately as soon as it encounters the manual activity. Manual activities in such a case may be flagged for post-process execution. In some embodiments, if no non-manual activities are detected for forward-progress execution, the engine terminates the process execution and returns immediately, no post-process execution of the remaining manual activities occurs because the process has ended, Similarly, rendezvous also known as "wait-for" activities that require waiting for external events to occur, are not allowed for a synchronous process engine as waiting may lock the associated resources.

In some embodiments, with a dedicated associated resource for the synchronous process engine, a simplification is to serialize the parallelized activities synchronous execution. Because the resource is dedicated, the synchronous serialized activities are many times faster than the asynchronous parallelized activities.

Suitability for Action Orchestration

Due to the manner in which it executes business processes, the synchronous process engine 302 may provide orchestration for actions within software applications. "Actions" are defined as changes to or retrieval of data needed by the application that typically require multiple steps and some specific sequencing to accomplish.

Examples of application actions carried out by the engine 302 include querying data from a relational database, calling a remote Web service, uploading content to a repository, sending electronic mail, and sending electronic files to an FTP site. These individual actions are orchestrated to form composite actions by the synchronous process engine 302. The engine 302 allows these actions to be carried out with very low latency with respect to their invocation, and for the information accessed by the actions to be modified without the need to coordinate complex distributed transaction semantics with the synchronous process engine. In some embodiments, the engine has no persistency requirements, thus there is no need for distributed transaction coordination with the data accessed by the engine's activities during execution. This is in contrast to where the distributed transaction coordination comes into play if the engine needs to persist state data, which is unnecessary for a synchronous process engine.

Example

Figure 3B:
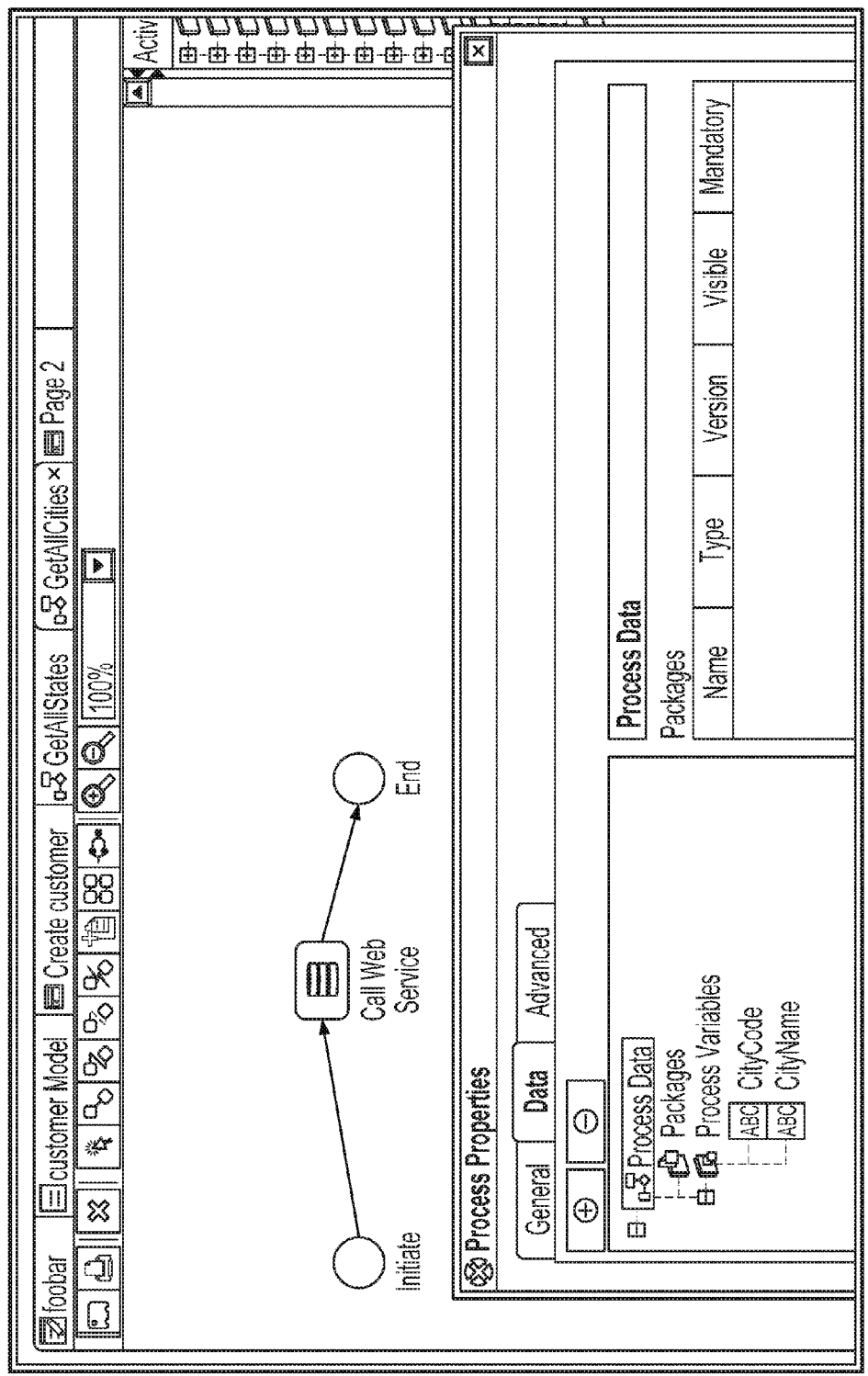
FIGS. 3B and 3C are screenshots illustrating a web service example of a synchronous process engine execution of a portion of a process.
Figure 3C:
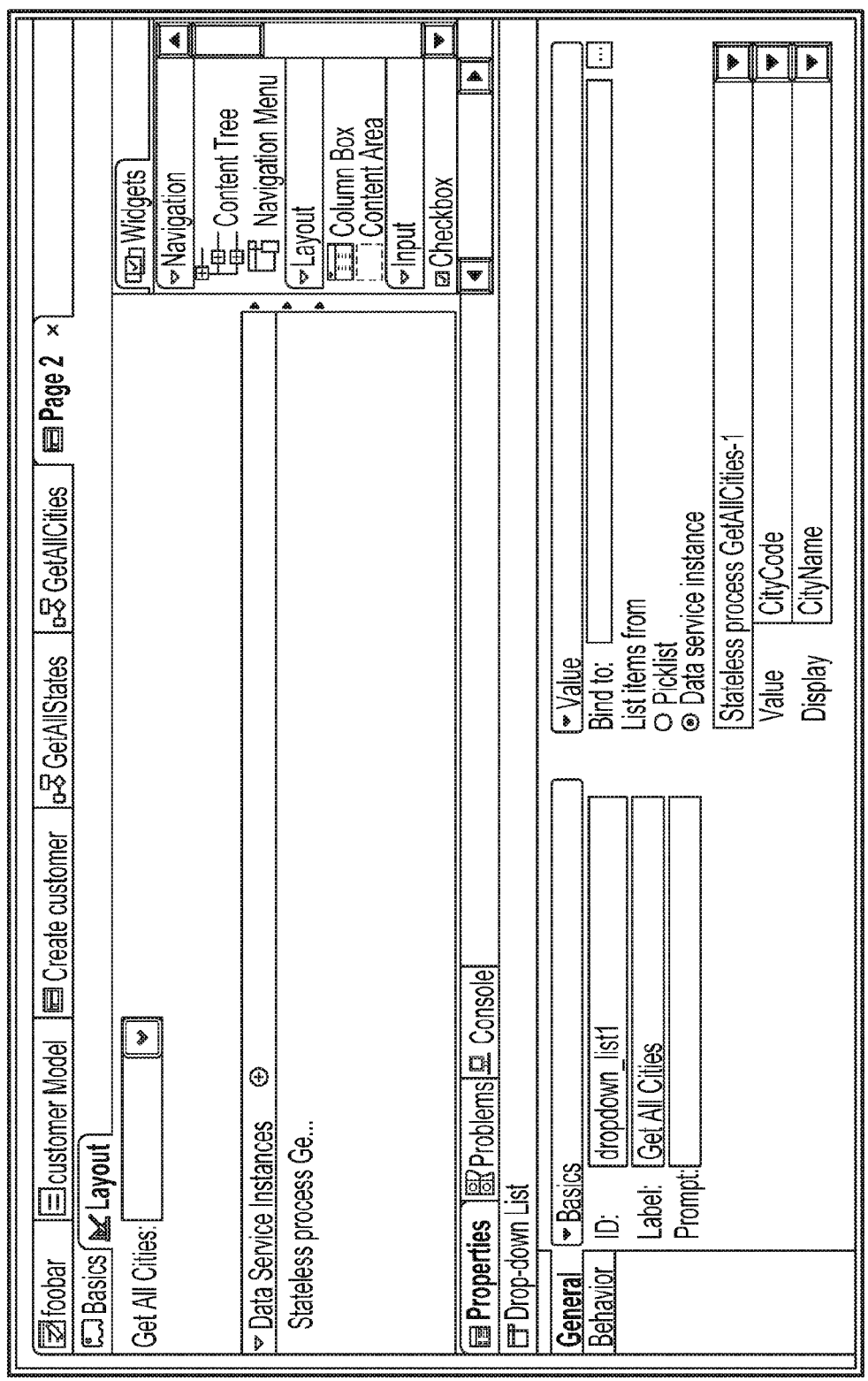

FIGS. 3B and 3C are screenshots illustrating a web service example of a synchronous process engine execution of a portion of a process.

One example is looking up city data to use in filling out user interface web forms, for example verifying zip codes and/or area codes, etc. The business portion of a process would be a single activity as shown in FIG. 3B. The activity is executed synchronously to fill out the drop-down GUI control on the Web Form to list all cities for a particular US State as shown in FIG. 3C.

Figure 4A:
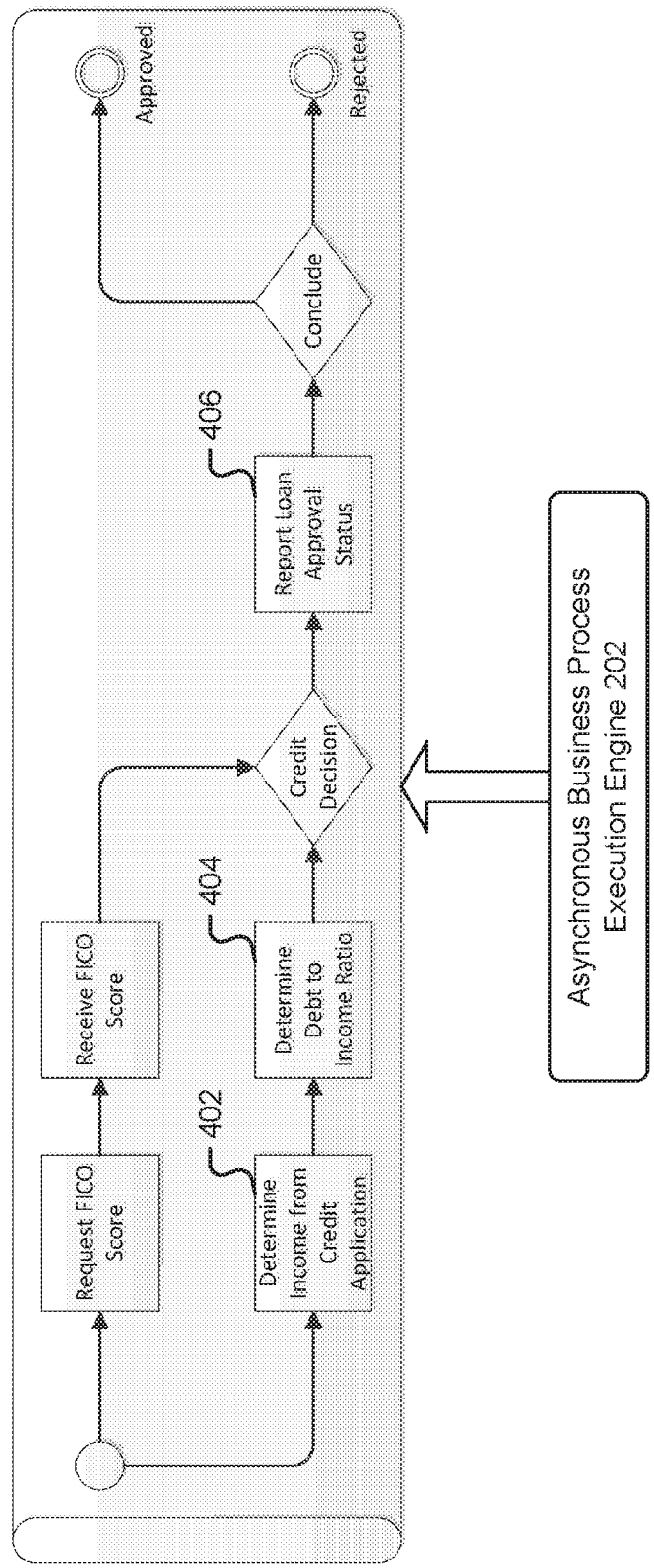
FIGS. 4A and 4B are diagrams illustrating an embodiment of a hybrid asynchronous and synchronous process engine specification and/or user interface.
Figure 4B:
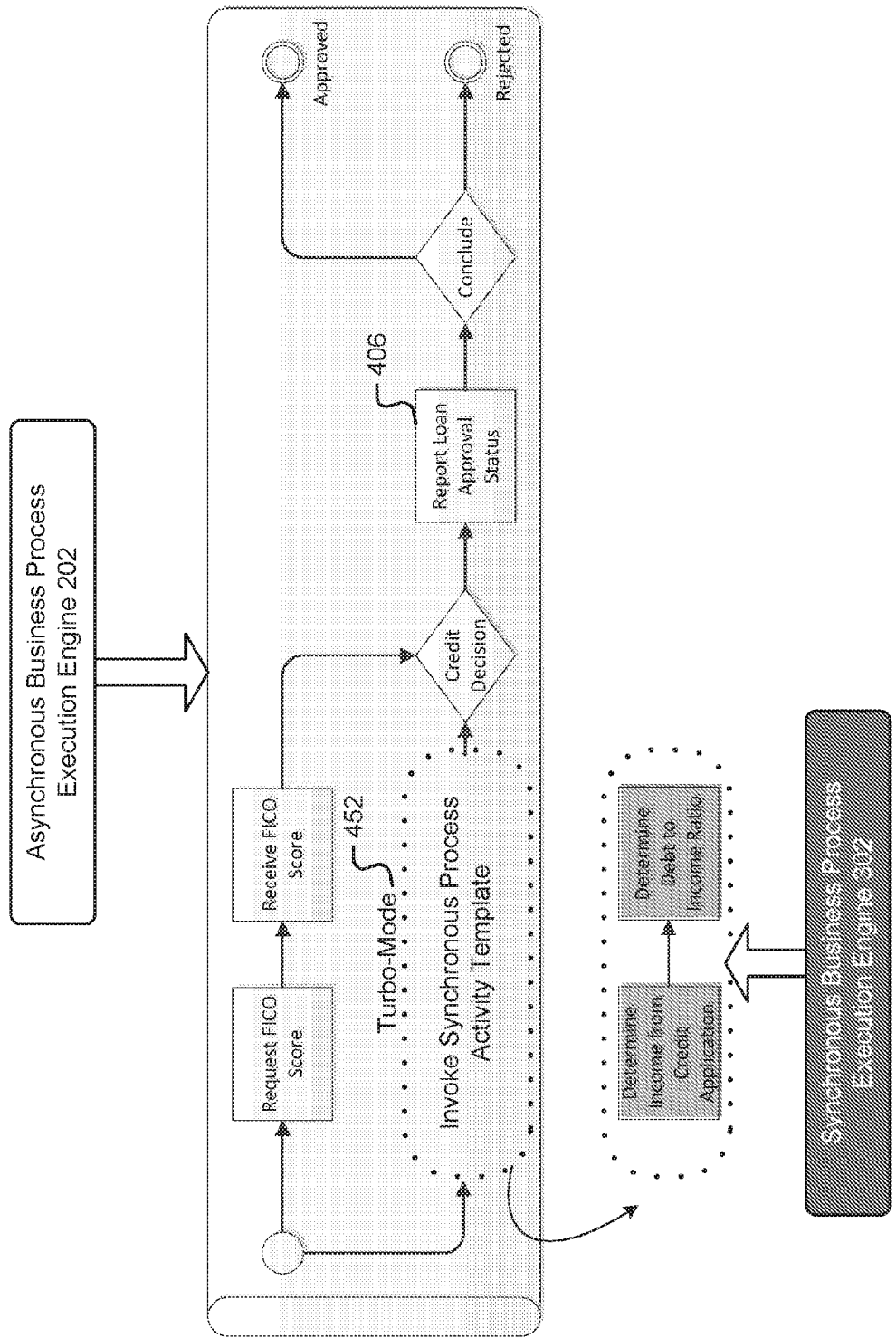

FIGS. 4A and 4B are diagrams illustrating an embodiment of a hybrid asynchronous and synchronous process engine specification and/or user interface. In FIG. 4A, a process is defined in, for example a flow model. Proprietary, de facto or industry standards may be used, for example the Business Process Model and Notation ("BPMN") standard, and expressed in a markup language, for example XML, the XML Process Definition Language ("XPDL") and/or the Business Process Execution Language ("BPEL").

In some embodiments upon model definition and/or creation, by default the system assumes an asynchronous process engine will execute all activities. The example given in FIG. 4A is a loan approval process which includes two sequential activities, a determination of income from a credit application 402 and a determination of a debt to income ratio 404, and another activity reporting the loan approval status 406. Using only an asynchronous engine 202, there may be no way to predict execution time for activities 402 and 404 together.

In FIG. 4B, the user or system specifies that activities 402 and 404 are to be executed synchronously 452 in a "Turbo Mode" by synchronous engine 302, and thus are shown in a different grey color. The remaining activities, for example 406, are still executed by the asynchronous engine 202. In this way the system designer can assign a predictable execution time for activities 402 and 404 together.

In one embodiment, an activity type called an "activity template" is used to represent the invocation of synchronous process/states within the larger business process. In FIG. 4B, a single activity 452 would represent a different process that would be executed synchronously (i.e. in "Turbo-mode"). That process would contain the two activities Determine Income from Credit Application and Determine Debt to Income Ratio.

Figure 5:
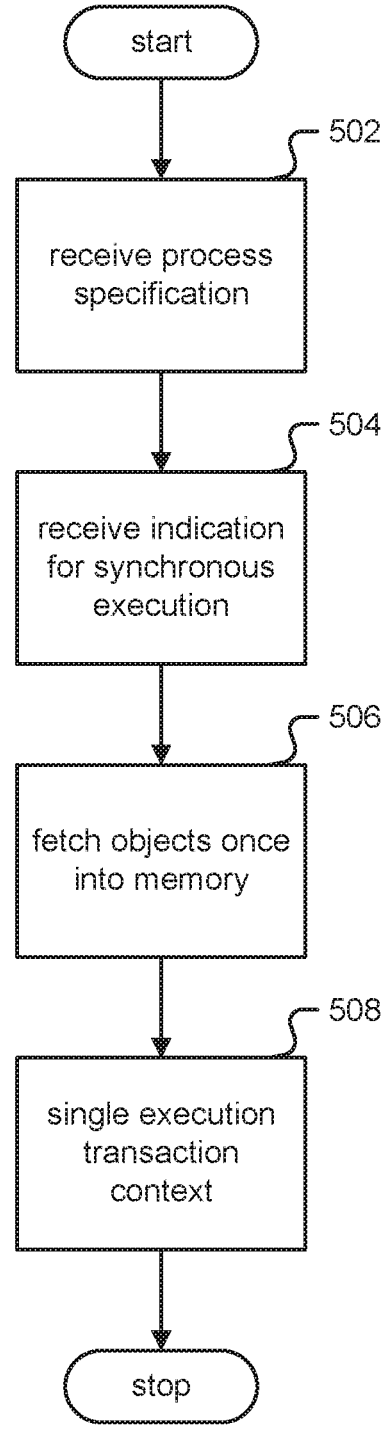
FIG. 5 is a flowchart illustrating an embodiment of a process for synchronous process engine execution.

FIG. 5 is a flowchart illustrating an embodiment of a process for synchronous process engine execution. In some embodiments the process of FIG. 5 is executed in synchronous process engine 302 of FIG. 3.

In step 502, an asynchronous business process specification declared in a procedural markup language comprising an activity flow model and more than one activity is received. For example, the procedural markup language may be expressed in XML (extensible markup language), XPDL (XML process definition language), BPEL (business process execution language), and/or BPMN (business process modeling notation).

In step 504, an indication that a subset of the activities is to be synchronously executed without reduced latency is received. In some embodiments, the synchronous subset that is manual activities is identified as null operations. The indication may be received via an API or via a user interface. In some embodiments, the engine 302 identifies any activities in the synchronous subset that are rendezvous activities and flags them as not synchronously executable. In some embodiments, the engine 302 identifies parallelized activities within the synchronous subset and serializes the parallelized activities for synchronous execution.

In step 506, all process execution related objects are fetched once into cache and/or memory. In step 508, the synchronous subset is executed in a single execution transaction context. For example, the synchronous subset may be executed without clearing the process execution related objects from the memory and/or without recording an execution state during the execution. Executing in a single execution transaction context includes executing with a predictable execution time. In some embodiments, the null operations are flagged for future manual execution.

Figure 6A:
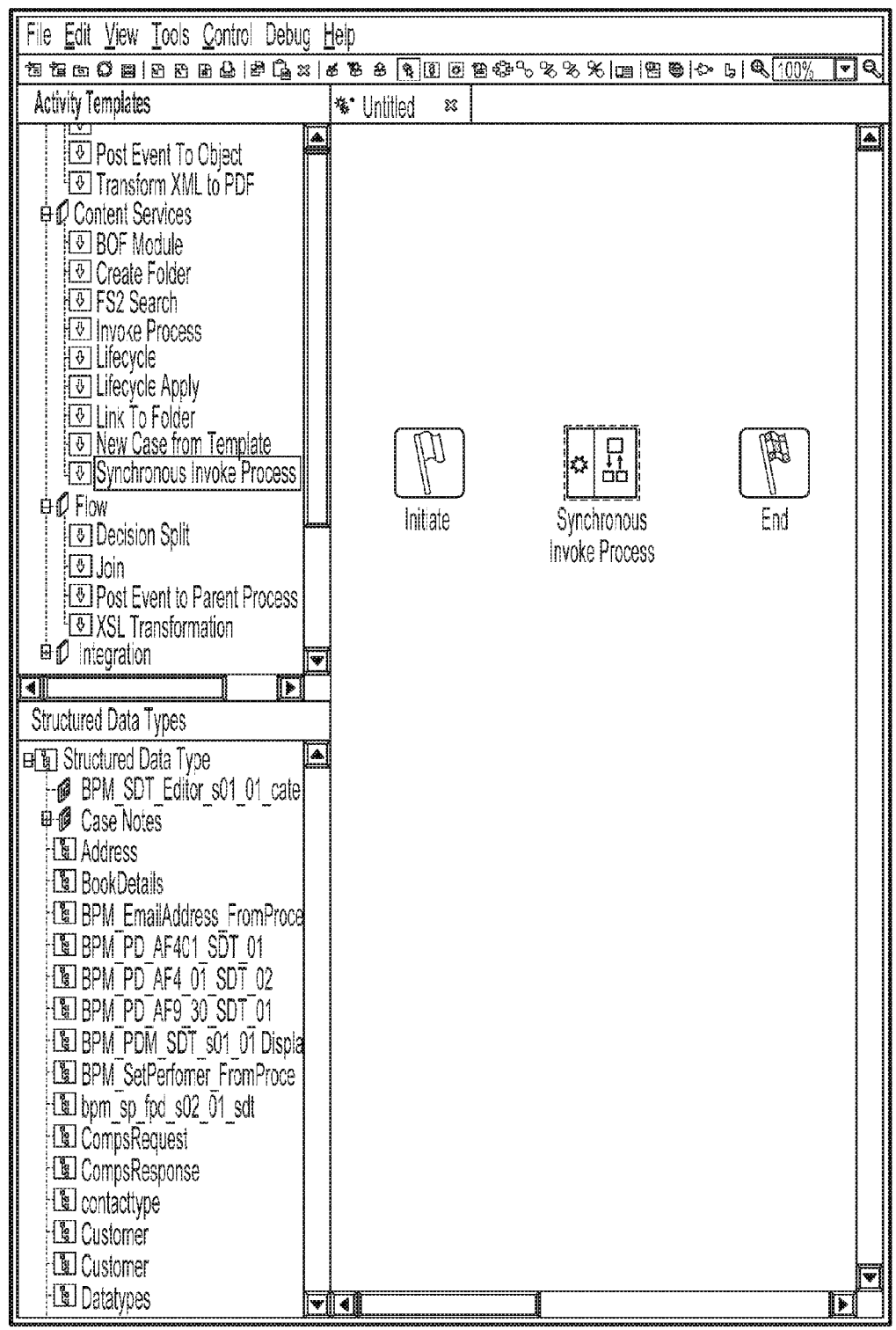
FIGS. 6A, 6B and 6C are screenshots used to describe to users on how to use the synchronous engine.
Figure 6B:
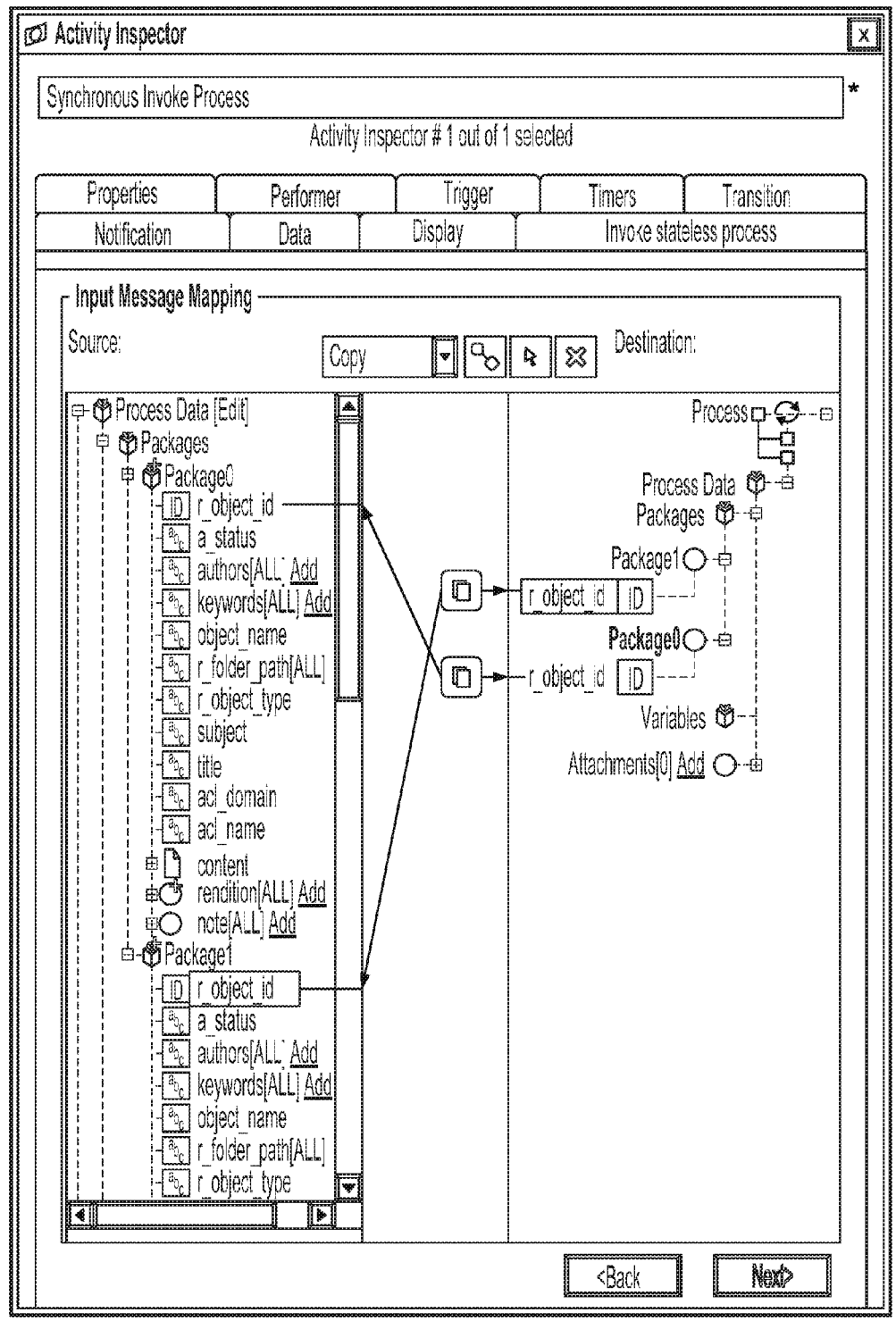
Figure 6C:
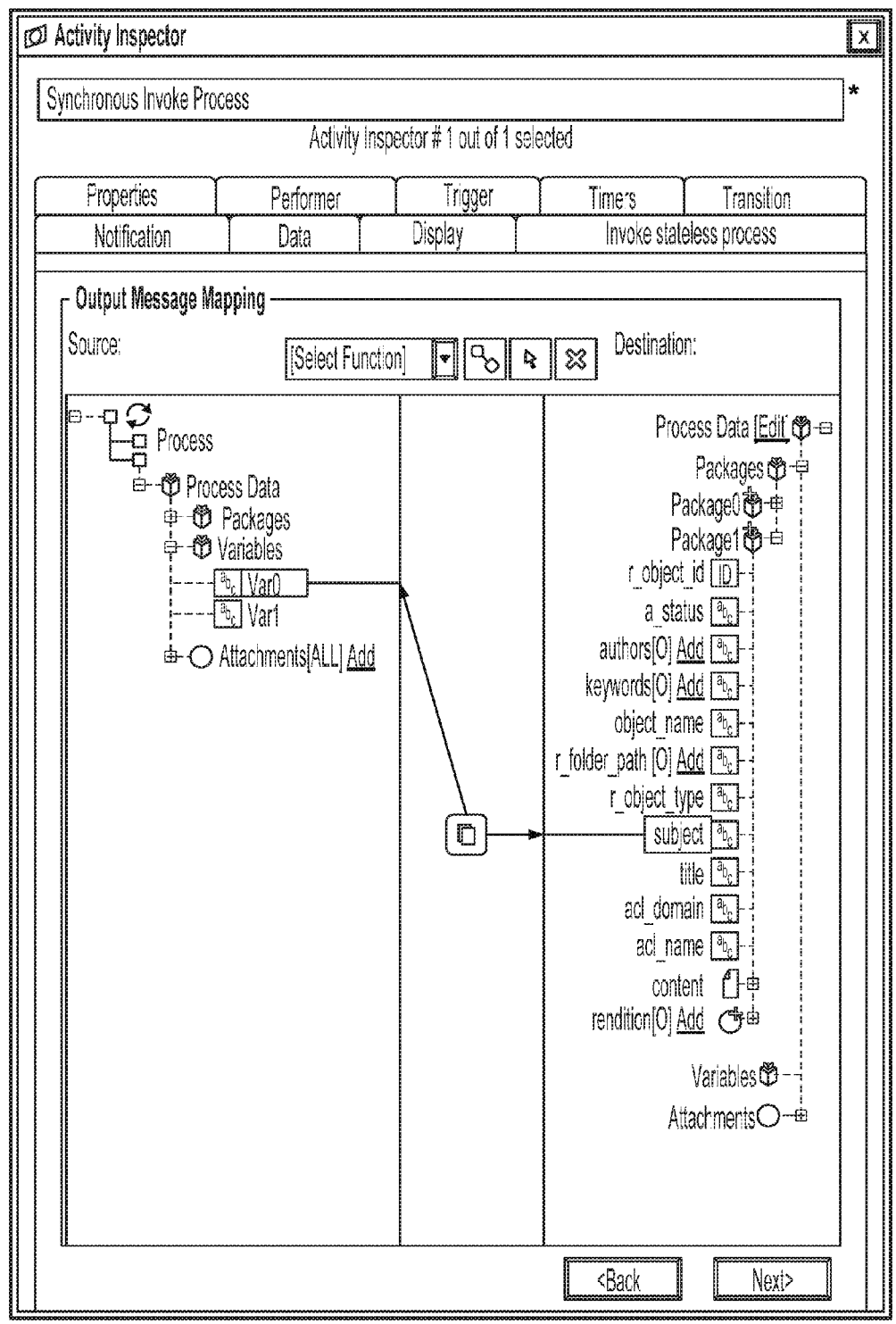

FIGS. 6A, 6B and 6C are screenshots used to describe to users on how to use the synchronous engine.

Without limitation, the following are example release notes that can be used to describe use of the synchronous engine:

Stateless Process Engine Release Notes

Use the stateless process engine to execute process instances in memory. The stateless process engine relies on a Synchronous Invoke Process activity that invokes a workflow synchronously. The synchronous transaction commits only at the end of the workflow, so that if an error occurs during the subprocess, the entire workflow fails.

The stateless process engine offers the following benefits:

Improved performance since the stateless process executes completely in the method server in one thread and in one session.

The Synchronous Invoke Process activity template supports input and output mapping. The standard Invoke Process template has input mapping only.

If better performance is desired and the invoked subprocess contains only automatic activities, the stateless process engine is easily applied to an existing accelerated composition platform solution. Applying the stateless process engine involves replacing the Invoke Process activity with the Synchronous Invoke Process activity.

Invoking process instances using the Synchronous Invoke Process activity provides significant performance improvement. For example, during in-house testing the execution time of one workflow instance containing 20 activities was reduced from three seconds to 160 milliseconds. Actual performance benefits depend on multiple factors including load, the number of processors, processor speed, and the nature of the activities in the process.

The following limitations may apply to stateless workflows:

Stateless processes execute in one transaction and in one thread. While executing a process in one transaction leads to improved performance, it also may increase the scope of the transaction when compared to a regular process. The increase in scope of transaction duration means there may be more version mismatch errors if another stateless or regular process modifies the same set of objects.

Stateless process instances may not populate the database used for reporting. Reporting may be disabled for stateless process instances.

Lifecycle activities may not supported as they rely on opening another transaction, and stateless process instances typically run in a single transaction.

All activities in the stateless process may be run by the performer of the synchronous invoke activity, regardless of the setting in the automatic activity.

A stateless process may not have manual activities, timer settings in activities, inbound initiate or step activities, or trigger conditions (or events) in activities.

Configuring a Stateless Workflow

1. Within a process builder, open a process.
2. Drag and drop the Synchronous Invoke Process activity template from the activity templates window on to the process template editor pane as shown in FIG. 6A.
3. Open an activity inspector and select Invoke Stateless Process.
4. In the Process Name list box select a process.
5. Complete the input message mapping to map the process data of the selected stateless process and click Next.
6. Complete the Output Message Mapping to map the completed process data to the parent process and click Ok as shown in FIG. 6B and FIG. 6C.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for generation of a RESTful data service, comprising:

a processor configured to:

receive a business process model associated with a business process that defines a sequence of activities comprising the business process, one or more inputs into the business process, and one or more outputs from the business process, wherein the business process requires access to disparate and multiple data sources, wherein a first activity of the sequence of activities comprises a first orchestrated access of a first data source, wherein a second activity of the sequence of activities comprises a second orchestrated access of a second different data source, wherein an activity of the sequence of activities comprises a data mapping step, wherein the business process model associated with the business process that defines the sequence of activities comprising the business process is to be executed in a single execution context and with a predictable and/or a determinate execution time;

read the business process model to identify at least one process variable defined by the business process model to be an input into the business process, and at least one process variable defined by the business process model to be an output from the business process;

configure a business process engine to:

receive the input into the business process corresponding to data for the at least one process variable defined by the business process model to be the input into the business process;

execute the entire sequence of activities comprising the business process without pause in response to receiving the input into the business process, including by mapping the input into the business process to at least some of the activities in the sequence of activities comprising the business process, orchestrating the first access to the first data source, orchestrating the second access to the second different data source, mapping and transforming data from each data source, and using temporarily stored process state data and process variables to coordinate the execution of the sequence of activities;

synchronously wait for the sequence of activities to complete and return the output from the business process corresponding to data for the at least one process variable defined by the business process model to be the output from the business process;

provide the output from the business process returned from the completed sequence of activities; and purge the temporarily stored process state data and process variables as soon as the output from the business process is returned;

generate service code for the RESTful data service that invokes the business process engine including by providing the input into the business process to the business process engine and processing the output from the business process that the business process engine is configured to provide; and generate a URL for the RESTful data service, wherein the URL represents the business process as an addressable resource;
bind the RESTful data service to a control in a user interface page builder;
store the service code bound to the control through the URL in a data storage unit in communication with a service layer;
receive an indication from a service user over a network to invoke the RESTful data service using the control on the user interface page;
recall the service code that invokes the business process through the RESTful data service from the data storage unit in communication with the service layer;
execute the RESTful data service that invokes the business process using the business process engine in the single execution context and with a predictable and/or a determinate execution time;
return the output from the business process to the user interface page; and
a memory coupled to the processor and configured to provide the processor with instructions.

2. The system as in claim 1, wherein the RESTful data service is accessed over HTTP.

3. The system as in claim 1, wherein URIs are used to address the output from the business process.

4. The system as in claim 1, wherein one of the disparate and multiple data sources comprises a docbase.

5. A system as in claim 1, wherein one of the disparate and multiple data sources comprises an external resource.

6. A system as in claim 5, wherein the external resource comprises a relational data base management system.

7. A system as in claim 5, wherein the external resource comprises a web service.

8. A system as in claim 5, wherein the external resource comprises a hypertext transfer protocol.

9. A method for generation of a RESTful data service, comprising:
receiving a business process model associated with a business process that defines a sequence of activities comprising the business process, one or more inputs into the business process, and one or more outputs from the business process, wherein the business process requires access to disparate and multiple data sources, wherein a first activity of the sequence of activities comprises a first orchestrated access of a first data source, wherein a second activity of the sequence of activities comprises a second orchestrated access of a second different data source, wherein an activity of the sequence of activities comprises a data mapping step, wherein the business process model associated with the business process that defines the sequence of activities comprising the business process is to be executed in a single execution context and with a predictable and/or a determinate execution time;
reading the business process model to identify at least one process variable defined by the business process model to be an input into the business process, and at least one process variable defined by the business process model to be an output from the business process;
configuring a business process engine to:
  receive the input into the business process corresponding to data for the at least one process variable defined by the business process model to be the input into the business process;
  execute the entire sequence of activities comprising the business process without pause in response to receiving the input into the business process, including by mapping the input into the business process to at least some of the activities in the sequence of activities comprising the business process, orchestrating the first access to the first data source, orchestrating the second access to the second different data source, mapping and transforming data from each data source, and using temporarily stored process state data and process variables to coordinate the execution of the sequence of activities;
  synchronously wait for the sequence of activities to complete and return the output from the business process corresponding to data for the at least one process variable defined by the business process model to be the output from the business process;
  provide the output from the business process returned from the completed sequence of activities; and
  purge the temporarily stored process state data and process variables as soon as the output from the business process is returned;
generating, using a processor, code for the RESTful data service that invokes the business process engine including by providing the input into the business process to the business process engine and processing the output from the business process that the business process engine is configured to provide; and
generating a URL for the RESTful data service, wherein the URL represents the business process as an addressable resource;
binding the RESTful data service to a control in a user interface page builder;
storing the RESTful data service bound to the control in a data storage unit in communication with a service layer;
receiving an indication from a service user over a network to invoke the RESTful data service using the control on the user interface page;
recalling the service code that invokes the business process through the RESTful data service from the data storage unit in communication with the service layer;
executing the RESTful data service that invokes the business process using the business process engine in the single execution context and with a predictable and/or a determinate execution time;
returning the output from the business process to the user interface page.

10. The method as in claim 9, wherein the RESTful data service is accessed over HTTP.

11. The method as in claim 9, wherein URIs are used to address the output from the business process.

12. The method as in claim 9, wherein one of the disparate and multiple data sources comprises a docbase.

13. A method as in claim 9, wherein one of the disparate and multiple data sources comprises an external resource.

14. A method as in claim 13, wherein the external resource comprises a relational data base management system.

15. A method as in claim 13, wherein the external resource comprises a web service.

16. A method as in claim 13, wherein the external resource comprises a hypertext transfer protocol.

17. A computer program product for generation of a RESTful data service, the computer program product being embodied in a tangible non-transitory computer readable storage medium and comprising computer instructions for:
receiving a business process model associated with a business process that defines a sequence of activities comprising the business process, one or more inputs into the business process, and one or more outputs from the business process, wherein the business process requires access to disparate and multiple data sources, wherein a first activity of the sequence of activities comprises a first orchestrated access of a first data source, wherein a second activity of the sequence of activities comprises a second orchestrated access of a second different data source, wherein an activity of the sequence of activities comprises a data mapping step, wherein the business process model associated with the business process that defines the sequence of activities comprising the business process is to be executed in a single execution context and with a predictable and/or a determinate execution time;

reading the business process model to identify at least one process variable defined by the business process model to be an input into the business process, and at least one process variable defined by the business process model to be an output from the business process;

configuring a business process engine to:
 receive the input into the business process corresponding to data for the at least one process variable defined by the business process model to be the input into the business process;
 execute the entire sequence of activities comprising the business process without pause in response to receiving the input into the business process, including by mapping the input into the business process to at least some of the activities in the sequence of activities comprising the business process, orchestrating the first access to the first data source, orchestrating the second access to the second different data source, mapping and transforming data from each data source, and using temporarily stored process state data and process variables to coordinate the execution of the sequence of activities;
 synchronously wait for the sequence of activities to complete and return the output from the business process corresponding to data for the at least one process variable defined by the business process model to be the output from the business process;
 provide the output from the business process returned from the completed sequence of activities; and
 purge the temporarily stored process state data and process variables as soon as the output from the business process is returned;

generating code for the RESTful data service that invokes the business process engine including by providing the input into the business process to the business process engine and processing the output from the business process that the business process engine is configured to provide; and generating a URL for the RESTful data service, wherein the URL represents the business process as an addressable resource;

binding the RESTful data service to a control in a user interface page builder;

storing the RESTful data service bound to the control in a data storage unit in communication with a service layer;

receiving an indication from a service user over a network to invoke the RESTful data service using the control on the user interface page;

recalling the service code that invokes the business process through the RESTful data service from the data storage unit in communication with the service layer;

executing the RESTful data service that invokes the business process using the business process engine in the single execution context and with a predictable and/or a determinate execution time;

returning the output from the business process to the user interface page.

18. A system as in claim 1, wherein the business process engine is further configured to:
 fetch at once one or more objects related to the execution of the entire sequence of activities from the multiple disparate data sources including the first data source and the second different data source;
 temporarily store the fetched objects for the duration of the execution.

19. A system as in claim 1, wherein configuring the business process engine comprises identifying any activities in the entire sequence of activities comprising the business process that are rendezvous activities and flag rendezvous activities as not synchronously executable.

20. A system as in claim 1, wherein reading the business process model to identify at least one process variable defined by the business process model to be an input into the business process comprises further receiving an indication from a business process builder user that a variable within the business process model is designated as one or more of the following: used for input only, used for input and output, used for output only, or not used for input or output.

* * * * *